United States Patent [19]

Terzian

[11] 4,037,202
[45] July 19, 1977

[54] MICROPROGRAM CONTROLLED DIGITAL PROCESSOR HAVING ADDRESSABLE FLIP/FLOP SECTION

[75] Inventor: John Terzian, Winchester, Mass.

[73] Assignee: Raytheon Company, Lexington, Mass.

[21] Appl. No.: 570,114

[22] Filed: Apr. 21, 1975

[51] Int. Cl.² .......................... F41G 7/00; G06F 9/12; G06F 11/04; G06F 15/50
[52] U.S. Cl. ................................ 364/200; 235/150.2; 235/153 A; 244/3.11
[58] Field of Search ................ 340/172.5; 235/153 A, 235/153 AC, 150.2; 244/3.11, 3.13, 77 R

[56] References Cited

U.S. PATENT DOCUMENTS

| | | | |
|---|---|---|---|
| 3,215,987 | 11/1965 | Terzian | 340/172.5 |
| 3,325,788 | 6/1967 | Hackl | 340/172.5 |
| 3,477,064 | 11/1969 | Hilgendorf et al. | 340/172.5 |
| 3,478,322 | 11/1969 | Evans | 340/172.5 |
| 3,560,933 | 2/1971 | Schwartz | 340/172.5 |
| 3,609,312 | 9/1971 | Higgins et al. | 235/153 AC |
| 3,831,148 | 8/1974 | Greenwald et al. | 340/172.5 |
| 3,859,636 | 1/1975 | Cook | 340/172.5 |
| 3,924,270 | 12/1975 | Kurtzberg | 340/172.5 |

Primary Examiner—Melvin B. Chapnick
Attorney, Agent, or Firm—Richard M. Sharkansky; Philip J. McFarland; Joseph D. Pannone

[57] ABSTRACT

A digital processor which is adapted for use in the guidance and stabilization of a guided missile. The digital processor is adapted to store a predetermined macroprogram and to process signals produced by various elements within the missile in accordance with such stored program thereby to produce control signals for the missile's flight control mechanism. A microinstruction memory stores sets of microinstructions, each one of such sets corresponding to one of a number of stored macroinstructions which make up the macroprogram. A register is provided which is adapted selectively to load an addressed microinstruction or a digital test word serially applied by sources external to the missile. In such an arrangement the missile's digital processor may be readily checked out through a relatively simple interface mechanism, also included. In the digital processor is a set of addressable flip/flops adapted to be set or reset by signals both internal to and external to the processor. The state of an addressed one of the set of flip/flops serves as a condition signal used in the execution of various ones of the microinstructions. The output of the macroprogram storage memory is adapted to be coupled to the address inputs of the data memory thereby enabling retrieval of both an instruction from the macroprogram memory and its corresponding operand from the data memory within a single clock pulse interval.

4 Claims, 10 Drawing Figures

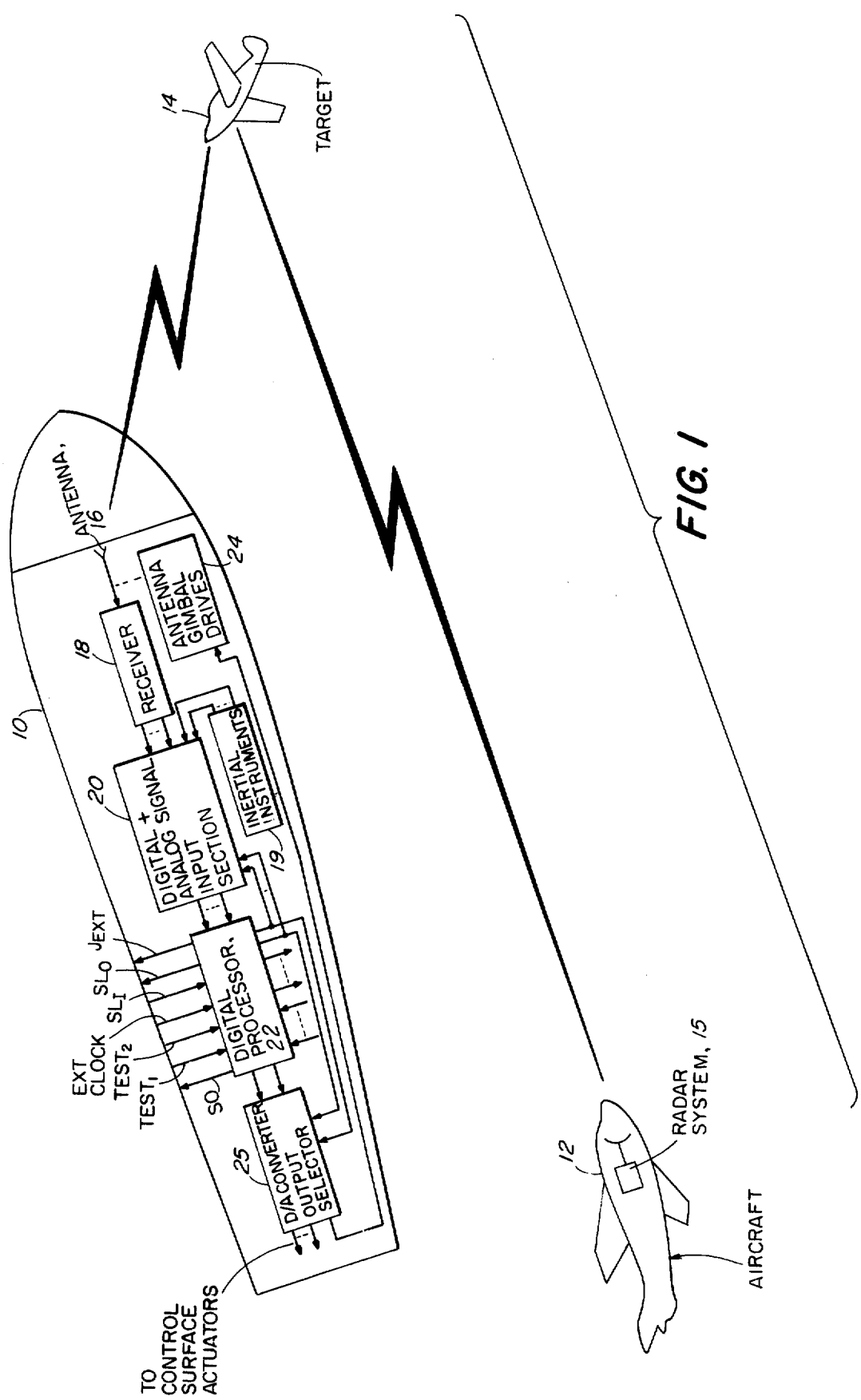

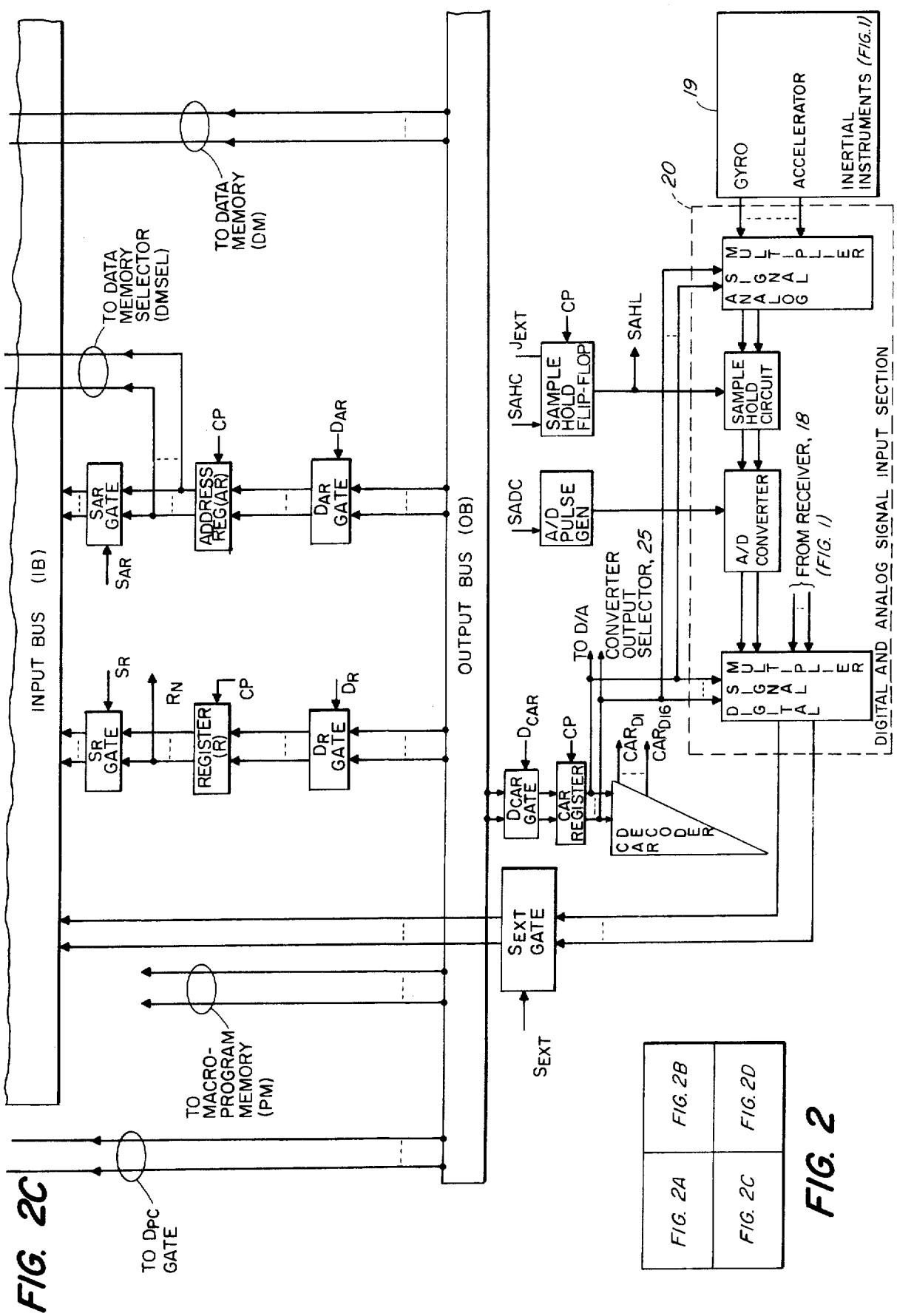

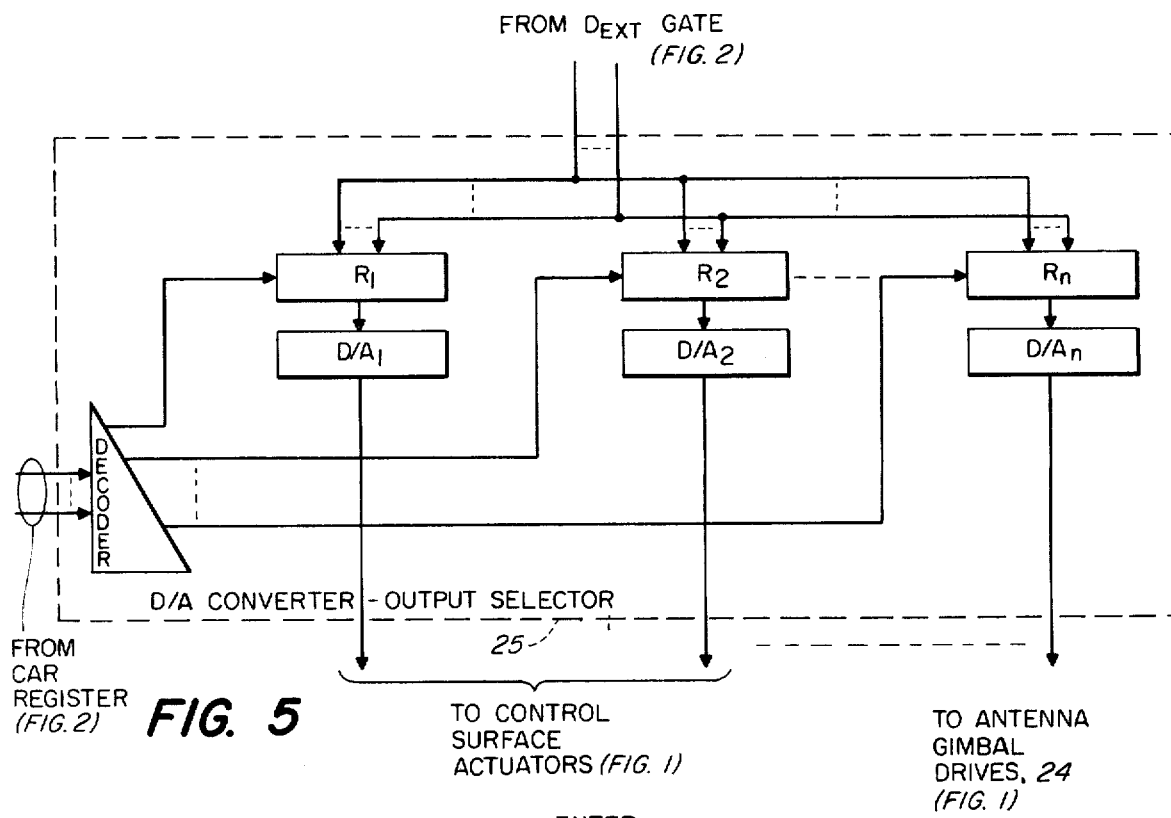
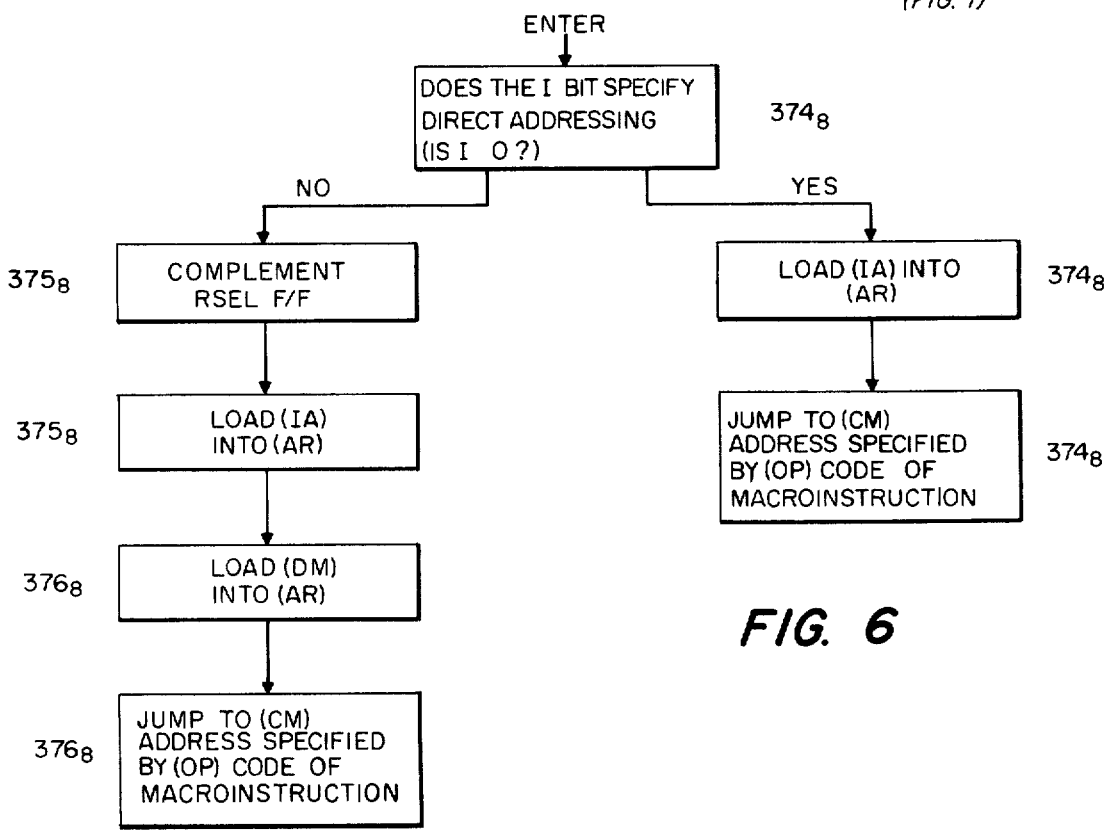

MICROPROGRAM CONTROLLED DIGITAL PROCESSOR HAVING ADDRESSABLE FLIP/FLOP SECTION

This invention herein described was made in the course of or under a contract or subcontract thereunder, with the Department of Defense.

BACKGROUND OF THE INVENTION

This invention relates generally to digital processors and more particularly to digital processors which are adapted for use in airborne missiles.

As is known in the art, a missile may be guided to a desired target by processing various received signals, such as radar echo signals, and applying such processed signals to the missile's flight control mechanism thereby to enable a successful intercept.

Generally such a missile includes an autopilot for developing these proper flight control mechanism signals. Known autopilots include integrators and summing amplifiers which combine outputs from various missile mounted sensing instruments, such as gyros and accelerometers, in a desired manner to stabilize and guide the missile.

In order for such an autopilot to operate efficiently over the wide range of aerodynamic conditions it is generally required that different gains and time constants of integrators and amplifiers be used when the missile travels in different portions of its operating range. These autopilots then are essentially analog signal processors and as such are sometimes limited by the degree of their processing versatility and sophistication and also by such things as component drift which may ultimately lead to an unsuccessful missile-target engagement.

Further, once the missile is "sealed," such an "analog signal processor" autopilot is not readily adaptable for checkout or testing. Such checkout or testing is generally required especially where the missile may be stored for long periods.

SUMMARY OF THE INVENTION

With this background of the invention in mind it is therefore an object of this invention to provide a digital processor for use in the guidance and stabilization of a guided missile.

This and other objects of the invention are attained generally by providing a digital processor adapted to store a predetermined macroprogram and to process signals produced by various elements within the missile in accordance with such stored program thereby to produce control signals for the missile's flight control mechanism. The digital processor includes, in addition to a means for storing the macroprogram, a data memory and a microinstruction control memory. This latter memory stores sets of microinstructions, each one of such sets corresponding to one of a number of stored macroinstructions which make up the macroprogram. A register is provided which is adapted selectively to load an addressed microinstruction or a digital test word serially applied by means external to the missile. Such an arrangement enables the missile's digital processor to be readily checked out through a relatively simple interface mechanism.

Also included in the digital processor is a set of addressable flip/flops adapted to be set or reset by signals both internal to and external to the digital processor. The state of an addressed one of the set of flip/flops serves as a condition signal used in the execution of various ones of the microinstructions.

Means are also provided which are adapted to couple the output of the macroprogram storage means to the address inputs of the data memory thereby enabling retrieval of both an instruction from the macroprogram memory and its corresponding operand from the data memory within a single clock pulse interval to the address terminals of the data memory to enable data addressed by such macroprogram storage means to be retrieved from the data memory within a single clock pulse interval.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein:

FIG. 1 is a sketch greatly distorted for illustrative purposes showing a missile launched from an aircraft and directed toward a target, such missile having on board a digital processor according to the invention;

FIG. 2 is a sketch showing how FIGS. 2A–2D are arranged to make up a block diagram of the digital processor according to this invention and the way such processor is interfaced with other equipment in the missile;

FIG. 5 is a block diagram of a D/A converter-output selector used as an interface between the digital processor and various control devices used in the missile; and, FIG. 6 is a flow chart of the FETCH sequence used by the digital processor.

DESCRIPTION OF THE PREFERRED EMBODIMENT

Figure 2A:
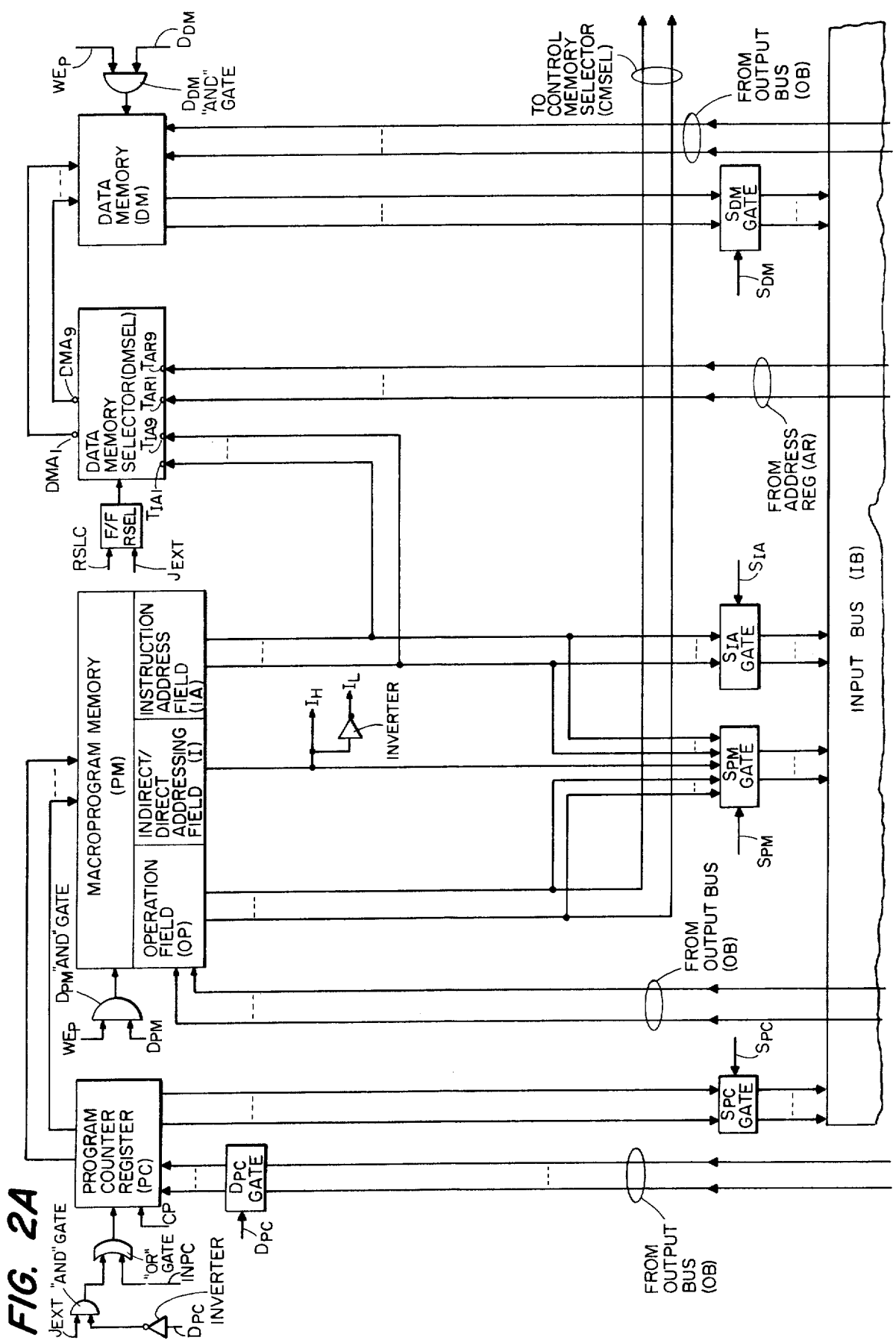
Figure 2B:
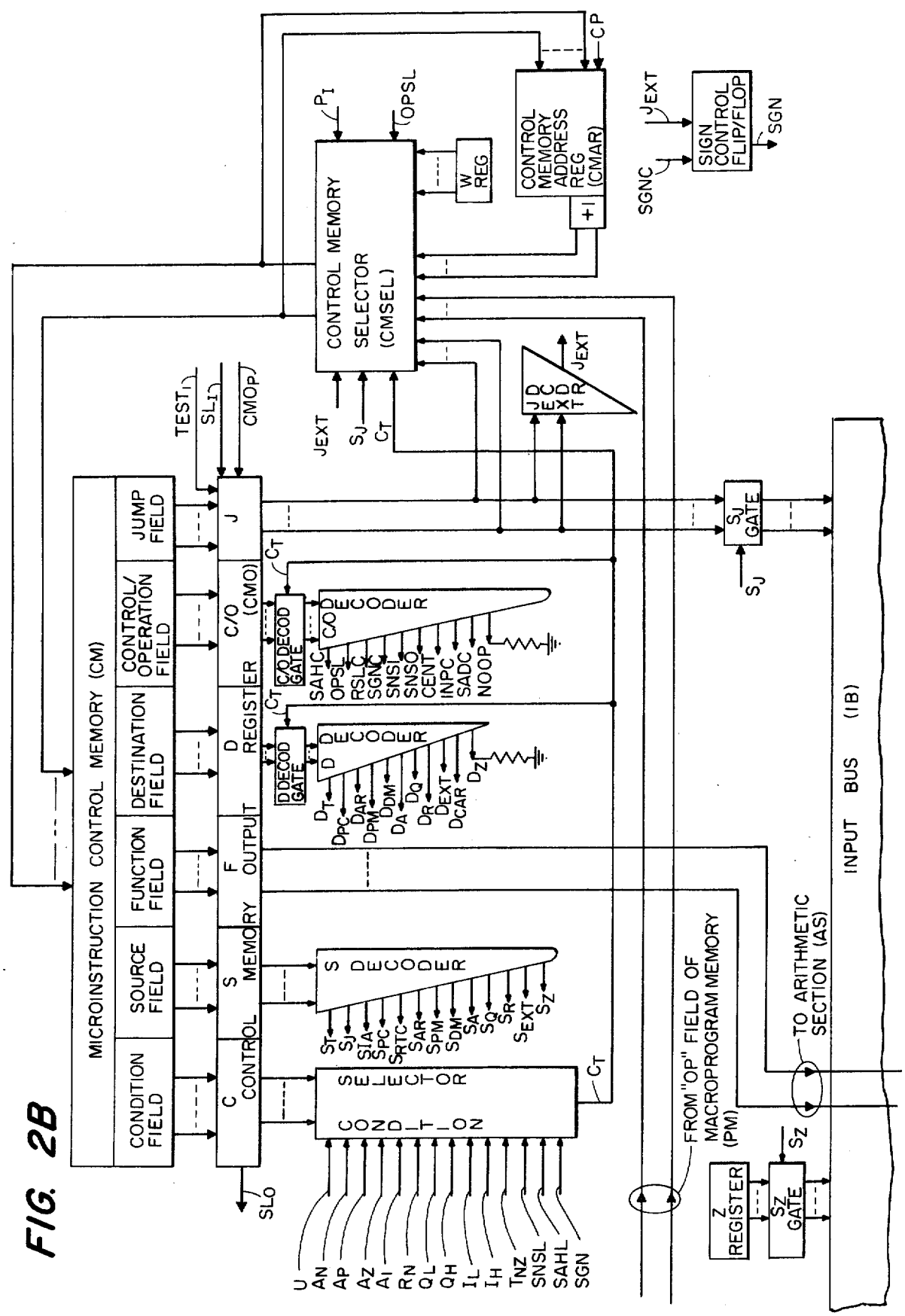

Referring now to FIG. 1, a missile 10 is shown launched from an aircraft 12 and directed towards a target 14 in accordance with processed echo signals received by the missile's receiving antenna 16 in response to reflections from target 14 of radar pulses transmitted by a radar system 15 carried by the aircraft 12. The received echo signals are passed through a conventional radar receiver 18 here including means (not shown) to convert analog signals to digital signals representative of the deviation of the target 14 from the missile receiving antenna's boresight axis. The digital signals along with analog signals supplied from inertial instruments 19 (such as gyros and accelerometers mounted in the missile 10), are passed to a digital and analog signal input section 20. The output of the digital and analog signal input section 20 is applied to a digital processor 22 wherein missile guidance and stabilization signals are supplied to the missile's control surface actuators (not shown) and antenna gimbal drives 24, via D/A converter-output selector 25, in a manner to be described in detail hereinafter.

It is here noted that missile 10 has a number of lines (i.e. line $TEST_1$, line $TEST_2$, line EXT clock, line SO, line $SL_I$, line $SL_o$, line JEXT) coupled between the digital processor 22 and ports (not numbered) disposed on the surface of the missile 10. As will be described in detail hereinafter such lines are here used for testing the digital processor 22 after such processor has been "sealed" in the missile 10. Further a number of other lines, not numbered in this figure, are shown for passing signals to and from the digital processor 22. As will become apparent hereinafter such signals are connected to a set of addressable flip/flops used in the digital processor 22.

Digital Processor

Referring now to FIGS. 2, 2a, 2b, 2c and 2d, the digital processor 22 is shown to include: Three memories (i.e. a macroprogram memory PM for storing a set of macroinstructions, a data memory DM, and a microinstruction control memory CM for storing sets of microinstructions); a number of registers (i.e. a program counter register PC, a general purpose register R, an accumulator register A, an address register AR, a multiplier-quotient register Q, a counter register T, and a channel address register CAR); an input bus (IB); an output bus (OB) and an arithmetic section (AS), all interconnected as shown and operative in a manner to be described to transfer data, in accordance with stored macroinstructions, from sources designated by sets of microinstructions, each one of such sets of microinstructions corresponding to one of the stored macroinstructions, to destinations designated by such sets of microinstructions, via input bus IB, arithmetic section AS and output bus OB. The sources and destinations include the macroprogram memory PM, the various registers mentioned above, the data memory DM, the microinstruction control memory CM and elements external to the processor, such as missile gyros, accelerometers and control surface actuators, as shown in FIG. 1.

The timing of the various elements in the digital processor 22 is by a timing and control unit the details of which will be discussed in connection with FIG. 3.

Macroprogram Memory (PM)

The macroprogram memory PM stores an operating program. Such program includes a set of digital words, each one of which is called a macroinstruction. Here each such digital word is made up of 16 bits. The macroinstructions, here up to 4096 digital words, are loaded into the macroprogram memory PM by any convenient means, not shown, such as a conventional paper tape reader. It should be noted that the macroprogram memory PM may be, alternatively, a read only memory. Typical macroinstructions are discussed in connection with various examples included herein.

Each one of the macroinstructions has three fields: A 6 bit operation field OP; a 1 bit indirect/direct addressing field I; and a 9 bit instruction address field IA. The operation field OP of each macroinstruction specifies an address for the first one of a sequence of microinstructions stored in the microinstruction control memory CM. The indirect/direct addressing field I indicates whether the data memory DM is to be directly addressed or, alternatively, indirectly addressed. The instruction address field IA specifies an operand address which may be used directly or indirectly as the address for the data memory DM or the macroprogram memory PM.

The macroprogram memory PM is addressed by a 12 bit program counter register PC in a conventional manner. When the contents of the program counter register PC change, in a manner to be described, the macroinstruction at such address will, after a predetermined settling delay, appear on the output lines of the macroprogram memory PM and will remain at such output lines until the program counter register PC contents are changed.

Data on the output bus OB may be written into the macroprogram memory PM when two conditions are satisfied: (1) the macroprogram memory PM is designated as a destination (i.e. line $D_{PM}$ is 1 or "high") and (2), a "high" signal is applied to write enable pulse line $WE_P$. The signals applied to the write enable pulse line $WE_P$ are generated in any conventional manner, here by passing the output of the processor clock CLCK (that is, the signals on line CM) through two cascaded one shot multivibrators, as shown in FIG. 3. The relationship between the clock pulses on line CP and the write enable pulses on line $WE_P$ is shown in FIG. 4.

Data Memory Selector (DMSEL)

The data memory DM and program memory PM are coupled together through a data memory selector DMSEL.

Data memory selector DMSEL is a conventional selector, here having two sets of input terminals, (i.e. input terminals $T_{IA1}$-$T_{IA9}$ and input terminals $T_{AR1}$-$T_{AR9}$) and a set of output terminals $DMA_1$-$DMA_9$, for coupling one of the two sets of input terminals to the output terminals selectively in accordance with the state of a flip/flop RSEL controlling the operation of such selector. In operation, when the flip/flop RSEL is in a "0" state the data memory selector DMSEL operates to enable the instruction address field IA to serve as the address for the data memory DM by coupling input terminals $T_{IA1}$-$T_{IA9}$ to output terminals $DMA_1$-$DMA_9$. Alternatively, when the flip/flop RSEL is in the "1" state the data memory selector DMSEL operates to enable the contents of the address register (AR) to serve as the address for the data memory DM by coupling input terminals $T_{AR1}$-$T_{AR9}$ to output terminals $DMA_1$-$DMA_9$. As will be discussed later, the flip/flop RSEL is cleared (i.e. set to the "0" state) when a "high" signal (i.e. a "1") is applied to line JEXT and is complemented (i.e. changes state: "0" state to "1" state or "1" state to "0" state) when a "high" signal is applied to line RSLC.

Data Memory (DM)

Data Memory DM is here a random access memory RAM used for storing data being processed. Here such memory is capable of storing 512 words, each having 16 bits. The data memory DM is addressed by data memory selector DMSEL as described above. When the data memory DM is directly addressed (that is, when the indirect/direct addressing field I is 0 or "low") the data memory selector DMSEL selects the instruction address field IA of the macroinstruction program memory PM to provide the address for the data memory DM. When the data memory DM is indirectly addressed (that is, when the indirect/direct addressing field I is 1 or "high") the contents of the address register AR provide the address for the data memory DM in a manner to be described.

Data on output bus OB may be written into the data memory DM when two conditions are satisfied: (1) such memory is designated as a destination (i.e. line $D_{DM}$ is "high") and (2) a "high" signal is applied to the write enable pulse line $WE_P$ as described above (FIG. 4).

It is further noted that, when the data memory selector DMSEL couples the instruction address field IA of the macroprogram memory PM directly to the data memory DM, the instruction address field IA of the addressed macroinstruction retrieves the data in the data memory DM at the address specified by such instruction address field IA within a single clock pulse interval.

Microinstruction Control Memory (CM)

The microinstruction control memory CM here is a read only memory ROM used for storing the sets of microinstructions, each one of such sets being used for execution of a corresponding one of the macroinstructions. Here the microinstruction control memory CM is capable of storing 256 words, each having 32 bits.

The microinstruction control memory CM is addressed by a control memory selector CMSEL in a manner to be described. A control memory output register CMO is provided to store the addressed microinstruction. The trailing edge of each clock pulse CP, supplied by the timing unit, executes the microinstruction currently resident in the control memory output register CMO and simultaneously strobes the next addressed microinstruction from the microinstruction control memory CM into the control memory output register CMO.

At each clock pulse the microinstruction currently resident in the control memory output register CMO is "conditionally" executed in a manner to be described and the next microinstruction is simultaneously loaded into the control memory output register CMO. The microinstructions (and hence the control memory output register CMO) have the following format: a four bit function condition field C; a four bit source field S; an eight bit junction field F; a four bit destination field D; a four bit control/operation field C/O; and an eight bit JUMP field J.

Briefly the condition field C is used to designate a logical condition which determines whether the microinstruction currently resident in the control memory output register CMO is to be executed or not. The source field S specifies the source of the data to be executed for such currently resident microinstruction. The function field F identifies the arithmetic or logical function to be performed by the arithmetic section AS on the data originating from the source selected by the source field S. The control operation field C/O specifies a control operation to be performed concurrently with the source field S, function field F and destination field D operations. The JUMP field J may be used to designate the address of the next microinstruction or, alternatively, may be used as a data source in which case the next sequential microinstruction address is selected (that is, as will be described, the control memory selector CMSEL selects the control memory register CMAR incremented by 1 as the address for the microinstruction control memory CM).

Typical microinstructions are discussed in connection with various examples included herewith.

Referring now more specifically to each one of the fields of the microinstructions, it is first noted that the condition field C of a microinstruction stored in the control memory register CMO is coupled to a condition selector. Such condition selector has a number of one bit condition input lines coupled thereto, in particular:

| Condition Input Lines | Remarks |
|---|---|
| U | - unconditional - (the level of such line is maintained "high" by any convenient means not shown) |
| $A_N$ | - accumulator register (A) negative. (This line is "high" when the contents in the accumulator register (A) are negative.) |
| $A_P$ | - accumulator register (A) positive. (This line is "high" when the contents in the accumulator register (A) are positive.) |
| $A_Z$ | - accumulator register (A) zero. (This line is "high" when the contents in the accumulator register (A) are zero). |
| $A_1$ | - accumulator register (A) minus one. (This line is "high" when the contents in the accumulator register (A) are minus 1, that is 1000...0). |
| $R_N$ | R register negative. (This line is "high" when the contents in the R register are negative). |
| $Q_L$ | - Q register LSB low (this line is "high" when the least significant bit (LSB) of the contents in the Q register are "low"). |
| $Q_H$ | - Q register LSB high (this line is "high" when the LSB of the contents in the Q register are "high"). |
| $I_L$ | - indirect bit low (this line is "high" when the indirect/direct addressing field (I) indicates direct addressing, that is when the I field is "low"). |
| $I_H$ | - indirect bit high (this line is "high" when the I field is "high"; that is, when indirect addressing is desired). |
| $T_{NZ}$ | - T counter not zero (this line is "high" when the number stored in the T register is not zero). |
| SNSL | - sense level high (this line is "high" when a selected one of a number of flip/flops, sometimes referred to herein as "sense flops," is in a "set" condition). |
| SAHL | - sample and hold flip/flop low (this line is "high" when a sample and hold flip/flop is in a "reset" condition). |
| SGN | - sign control flip/flop (this line is "high" when a sign flip/flop is in a "set" condition) |

The condition field C of the microinstruction stored in the control memory register CMO selectively couples one of the 1 bit condition input lines (i.e. U, $A_N$, $A_p$ ... SGN) to the output of the condition selector, that is to condition true line $C_T$. If such line $C_T$ is "high" (i.e. "1") the condition selected by the condition field C is said to be "true". Condition line $C_T$ is fed to: The control memory selector CMSEL, the destination field decoder gate D DECOD GATE and the control/operation field decoder gate C/O DECOD GATE.

The source field S of the microinstruction currently resident in the control memory output register CMO is coupled to an S decoder. In accordance with the source field S of such resident microinstructions one of a number of source output lines at the output of such S decoder is raised to a "high" level (all other lines being at a "low" level) thereby selecting the source of data for execution by the microinstruction currently resident in the control memory output register CMO. Such source output lines are

| Source Output Line | Gate Coupled to Source Output Line | | Source Selected by S Field |
|---|---|---|---|
| $S_T$ | $S_T$ | Gate | T Register |
| $S_J$ | $S_J$ | Gate | JUMP field (J) |
| $S_{IA}$ | $S_{IA}$ | Gate | Instruction address (IA) field of the word currently read from the macroprogram memory (PM) |
| $S_{PC}$ | $S_{PC}$ | Gate | Program counter register (PC) |
| $S_{RTC}$ | $S_{RTC}$ | Gate | Real Time Clock (RTC) |
| $S_{AR}$ | $S_{AR}$ | Gate | Address Register (AR) |
| $S_{PM}$ | $S_{PM}$ | Gate | Macroprogram Memory (PM) |
| $S_{DM}$ | $S_{DM}$ | Gate | Data memory (DM) |
| $S_A$ | $S_A$ | Gate | Accumulator register (A) |

-continued

| Source Output Line | Gate Coupled to Source Output Line | | Source Selected by S Field |
|---|---|---|---|
| $S_Q$ | $S_Q$ | Gate | Q register |
| $S_R$ | $S_R$ | Gate | R register |
| $S_{EXT}$ | $S_{EXT}$ | Gate | External source |
| $S_Z$ | $S_Z$ | Gate | Zero register (Z) |

When a "high" signal is applied to one of such source output lines the digital word applied to the gate coupled to such output line is allowed to pass to input bus IB thereby coupling the source selected by the source field (S) to such input bus IB.

The function field F of the microinstruction currently resident in the control memory output register CMO is coupled to the arithmetic section AS. The arithmetic section AS will be described in detail hereinafter. Suffice it to say here, however, that data on the input bus IB is processed by the arithmetic section AS in accordance with the function field (F) of the microinstruction currently resident in the control memory register CMO and such processed data is applied to the output bus OB.

The destination field D of the microinstruction currently resident in the control memory output register CMO is coupled to a D decoder through a D DECOD GATE when the signal on condition time line $C_T$ is "high," that is when the condition associated with such microinstruction is "true." In accordance with the destination field D one of the destination lines at the output of the D decoder is raised to a "high" level (all other lines being at a "low" level) thereby selecting the destination of the word passed to the output bus OB by the arithmetic section AS. Such output lines are:

| Output Destination Lines | Gate Coupled to Destination Output Lines | Destination Selected by D Field |
|---|---|---|
| $D_T$ | $D_T$ Gate | T Counter Register |
| $D_{PC}$ | $D_{PC}$ Gate | Program Counter Register (R) |
| $D_{AR}$ | $D_{AR}$ Gate | Address Register (AR) |
| $D_{PM}$ | $D_{PM}$ "AND" Gate | Write Enable line of Macroprogram Memory (PM) |
| $D_{DM}$ | $D_{DM}$ "AND" Gate | Write Enable line of Data memory (DM) |
| $D_A$ | $D_A$ Gate | Accumulator Register (A) |
| $D_Q$ | $D_Q$ Gate | Q Register |

-continued

| Output Destination Lines | Gate Coupled to Destination Output Lines | Destination Selected by D Field |
|---|---|---|
| $D_R$ | $D_R$ Gate | R Register |
| $D_{EXT}$ | $D_{EXT}$ Gate | External |
| $D_{CAR}$ | $D_{CAR}$ Gate | Channel Address Register (CAR) |
| $D_Z$ | To ground (As shown) | None |

When one of such output lines is "high" the digital word on the output bus B is enabled to pass through the gate coupled to such one of the output lines to the designated element, except for lines $D_{DM}$ and $D_{PM}$ which, together with the signal on lines $WE_p$, activate the write enable lines for the data memory DM and the macroprogram memory PM, as described above.

The control/operation C/O field of the microinstruction currently resident in the control memory output register CMO is coupled to a C/O decoder through a C/O DECOD GATE when the signal on condition true line $C_T$ is "high," that is, when the condition associated with such microinstruction is "true." In accordance with the control operation C/O one of the operation lines at the output of the C/O decoder is raised to a "high" level (all other lines being at a "low" level) thereby enabling a desired control/operation C/O to be performed currently with the source field S, function field F and destination field D operations of the currently resident microinstruction. Such control/operation lines are:

| Control/Operation Lines | Element Coupled to Control/Operation Lines | Condition/Operation |
|---|---|---|
| NOOP | To Ground (As shown) | No operation |
| OPSL | Control Memory Selector (CMSL) | Microinstruction Control Memory address is provided by the operation field (OP) of the selected macroinstruction |
| RSLC | Flip/Flop RSEL | Complement the flip/flop RSEL |
| SGNC | Sign Control Flip/Flop | Complement the sign control flip/flop |
| SAHC | Sample and Hold Flip/Flop | Complement the sample/hold control flip/flop |
| SNS1 | Sense Flip/Flop Selector | Set flip/flop selected by channel address register (CAR) to 1 |
| SNS0 | Sense Flip/Flop Selector | Set flip/flop selected by channel address register (CAR) to 0 |
| CENT | T Register | Count Enable T Counter Register |
| INPC | Program Computer Register (PC) | Count Enable Program Counter Register (PC) |
| SADC | A/D Pulse Generator | Initiate A/D converter control pulse |

The JUMP field J of the microinstruction currently resident in the control memory output register CMO is coupled to: (a) the control memory selector (CMSEL); (b) a JEXT decoder for producing a "high" signal on line JEXT when the contents of the JUMP field J signify a jump to the "Fetch" microprogram as will be described later and, (c) to the input bus IB when such JUMP field J is selected as a source (that is, when source line $S_J$ is at a "high" level).

The jump field J can be used as:

1. a constant when the source field S specifies the JUMP field J. [In this case the control memory selector CMSEL selects, in response to a high signal on source line $S_J$, the control memory address register CMAR output, incremented by one, (for reasons described above), so that the next microinstruction to be executed is the one following the current microinstruction.]

2. an address for the microinstruction control memory CM when the condition is satisfied or "true", (i.e. the condition line, $C_T$, is at a "high" level).
3. JXIT, (when the JUMP field J contains a special code (here, for example, $374_8$) is used to indicate that the last of the set of microinstructions associated with a macroinstruction is selected. (It is noted that if the JUMP field J is selected as a source by the source field S, the code or JUMP field J is taken as a regular constant.) When the JXIT code is applied to the JUMP field J the JEXT decoder produces a "1" or "high" signal on line JEXT. The JEXT line is fed to: The program counter register (PC); the flip/flop RSEL; the sample/hold flip/-flop; the T register; the sign control clip/flop; and the control memory selector (CMSEL) thereby to:
  a. increment the program counter register PC (if the signal on Line $D_{PC}$ is low);
  b. reset the flip/flop RSEL to zero;
  c. reset the sample/hold flip/flop to zero;
  d. reset the T register to zero;
  e. reset the sign control flip/flop; and
  f. provide a logic signal to the control memory selector CMSEL (to be described).

Control Memory Selector (CMSEL)

The address of the next microinstruction to be strobed into the control memory output register CMO is delivered by the control memory address selector CMSEL from a selected one of four sources:

1. the operation field OP of the macroprogram memory PM (i.e. the addressed macroinstruction);
2. an 8 bit JUMP field J of the microinstruction stored in the control memory output register CMO;
3. the incremented output of an 8 bit control memory address register CMAR (i.e. CMAR + 1). (At each clock pulse CP the address of the selected microinstruction is strobed into the control memory address register CMAR. Such register CMAR is followed by a +1 adder so that such register thereby may be considered as provided an incremented address for the microinstruction control memory CM where selected by the CMAR);
4. predetermined, fixed address W, stored in a "W" address register and selected in response to a program interrupt signal $P_I$, to be described later.

The one of the four sources used for addressing the microinstruction control memory CM is selected in accordance with binary signals supplied to the control memory selector CMSEL on the following lines: line $S_J$ (source = J field); line OPSL (select function code OP); line $C_T$ (condition true); line $P_I$ (program interrupt); and line JEXT (end of microinstructions) as described in Table I.

Table I

| line $S_J$ | line JEXT | line $P_I$ | line $C_T$ | line OPSL | CMSEL OUTPUT |
|---|---|---|---|---|---|
| 1 | X | X | X | X | CMAR + 1 |
| 0 | 1 | 1 | X | X | W |
| 0 | 1 | 0 | X | X | JUMP FIELD (J) |
| 0 | 0 | X | 1 | 1 | (OP) FIELD |
| 0 | 0 | X | 1 | 0 | JUMP FIELD (J) |
| 0 | 0 | X | 0 | X | CMAR + 1 |

X = DON'T CARE

Control Memory Output Register (CMO)

The control memory output register CMO here is comprised of a series of 8 appropriately cascaded 4 bit bidirectional universal shift registers (for example Sn 54194 manufactured by Texas Instruments, Incorporated, Dallas, Texas 75222) adapted for parallel loading (i.e. loading from the microinstruction control memory CM, as described,) or serial loading (i.e. loading data applied to serial input line $SL_I$(FIG. 1)), selectively in accordance with a 1 bit binary signal on line $TEST_1$ in a manner to be described in connection with testing the digital processor. Suffice it to say here, however, that such parallel or serial data loading is selected in accordance with the binary signal applied to line $TEST_1$. In particular, when the binary signal on line $TEST_1$ is "low" (i.e. 0) the control memory output register CMO accepts data exclusively from the microinstruction control memory (that is, such control memory register CMO is set for parallel data loading) as is the case during normal operation of the digital processor, and when the signal on line $TEST_1$ is "high" (i.e. 1) such register CMO accepts exclusively data serially applied thereto via line $SL_I$ as is the case during checkout of the digital processor. Further clock pulses are applied to the control memory output register CMO on line $CMO_P$. Such clock pulses are supplied by the timing unit shown in detail in FIG. 3. Such timing unit will be described in detail hereinafter. Sufficient to say here, however, that when data is being applied serially to the control memory register CMO via line $SL_I$, clock pulses are applied to line $CMO_P$ via an external clock EXT CLOCK and when such register CMO is set for parallel operation (i.e. line $TEST_1$ is "low", clock pulses from the processor clock CLCK are applied to such register CMO via line $CMO_P$ (FIG. 3).

Arithmetic Section (AS)

The digital processor includes a two bus system (i.e. input bus IB and output bus OB for providing movement of data between a designated source and a designated destination through a centralized arithmetic section AS. In the execution of each one of the microinstructions resident in the control memory register CMO, information from a selected data source (as defined by the source field S) is gated onto the input bus IB, operated on by the arithmetic section AS in accordance with the function field F and presented to the output bus OB for a destination in accordance with the destination field D providing certain conditions are met in accordance with the condition field C.

The arithmetic section AS performs arithmetic or logic operations on data appearing at its input terminals $ALU_1$ and $ALU_2$ in accordance with the function field F in a conventional manner. The input terminals $ALU_2$ are connected to the output of the accumulator register A. The operation to be performed by the arithmetic section AS is specified by the function field F in the control memory output register CMO. Logic levels representing the results of the operation appear at the output of the arithmetic section AS. Such output is passed to the output bus OB. When an overflow condition is indicated, a "high" signal is produced on line OVA, in a conventional manner, such line OVA being coupled to the set input of one of 16 flip/flops included in a sense flip/flop section, here F/F 16, in a manner to be described.

Program Counter Register (PC)

The program counter register PC is a 12 bit counter whose outputs are directly connected to the address lines of the macroprogram memory PM. The program counter register PC holds the address of the next macroinstruction to be executed and such program counter PC increments in response to a "high" signal on line INPC (such being supplied by the C/O decoder coupled to the control/operation C/O field of the control memory output register CMO) or in response to a high signal on line JEXT if the program counter register PC is not designated as a destination (i.e. line $D_{PC}$ is "low"). It is noted that when the program counter (PC) is selected for destination (that is when the destination field D raises the level of destination line $D_{PC}$) the data on output bus OB is written into the program counter register PC without incrementing.

General Purpose Register (R)

An R register is provided for temporary storage of data during instruction execution. Such R register is a 16 bit register coupled to input bus IB or the output bus OB by enabling (or "high" level) signals applied to line $S_R$ or $D_R$, respectively. The most significant bit of the contents stored in the R register is coupled on line $R_N$ to provide a "high" signal on such line $R_N$ when the word stored in the R register is negative and to provide a "low" signal on such line when such stored word is negative. Such line $R_N$ is fed to the condition selector.

Zero Register (Z)

The zero register Z has stored therein a 16 bit word, here 00 . . . 0. When the line $S_Z$ is raised 16 binary zeros are thereby applied to the input bus IB.

Address Register (AR)

Address register AR is a 12 bit register whose low order 9 bits store addresses for the data memory DM when indirect addressing is used. (In this regard it is noted that the output of address register AR is directly coupled to the data memory selector DMSEL input terminals $T_{AR1}$ - $T_{AR9}$.) The address register AR is also available for general use when indirect addressing is not used. Such address register AR is coupled to the input bus IB or the output bus OB by enabling (or "high" level) signals applied to lines $S_{AR}$ or $D_{AR}$ respectively.

Accumulator Register (A)

The accumulator or A register is a 16 bit register generally used for storing operands and results of arithmetic or logical operations. The output of such register is coupled, inter alia, to the $ALU_2$ input terminal. Further, the data stored in the accumulator is passed to an "A" decoder having output lines $A_P$, $A_N$, $A_Z$, $A_1$. Such lines are coupled to the condition selector and are raised to a "high" level as follows:

| line raise to "high" level | condition |
|---|---|
| $A_P$ | accumulator stores positive number |
| $A_N$ | accumulator stores negative number |
| $A_Z$ | accumulator stores 0 |
| $A_1$ | accumulator stores 10000000...0 (i.e. minus 1) |

The accumulator is also coupled to the input bus IB or the output bus OB by enabling (or "high" level) signals applied to lines $S_A$ or $D_A$ respectively. Further, the least significant bit LSB of the accumulator register A is coupled to the most significant bit MSB of the Q register to permit use of the two registers A and Q as a single double length (32 bit) shift register in a conventional manner.

Multiplier Quotient Register (Q)

The Q register is a 16 bit multiplier quotient register. For certain operations the contents of the accumulator register A and the Q register are treated as a single, double length register. These operations are conventional and well known in the computer art and hence, forming no part of the present invention, will not be discussed in detail. Further, the least significant bit of the contents stored in the Q register is coupled to line $Q_H$ and to line $Q_L$ through an inverter, as indicated. The most significant bit of such Q register is applied to a serial output line, SO (FIG. 1).

The Q register is also coupled to the input bus IB or the output bus (OB) by enabling (or "high" level) signals applied to lines $S_Q$ and $D_Q$, respectively.

Counter-Register (T)

The counter-register T is a 12 bit register adapted to accept data on output bus OB when an enabling signal is applied to the $D_T$ gate and also to increment the contents stored therein by 1 when a high signal is applied on line CENT from the control/operation C/O field of the microinstruction current resident in the control memory output register CMO. The counter-register T is reset to 0 when a "high" signal is supplied to the JEXT line. Further, a T decoder is coupled to the output of the counter-register T to provide a high signal (or 1) on line TNZ when the number stored in such register is not zero. The counter-register T is coupled to the input bus IB by enabling (or "high" level) signals applied to line $S_T$.

Real Time Counter and Program Interrupt

Figure 2D:
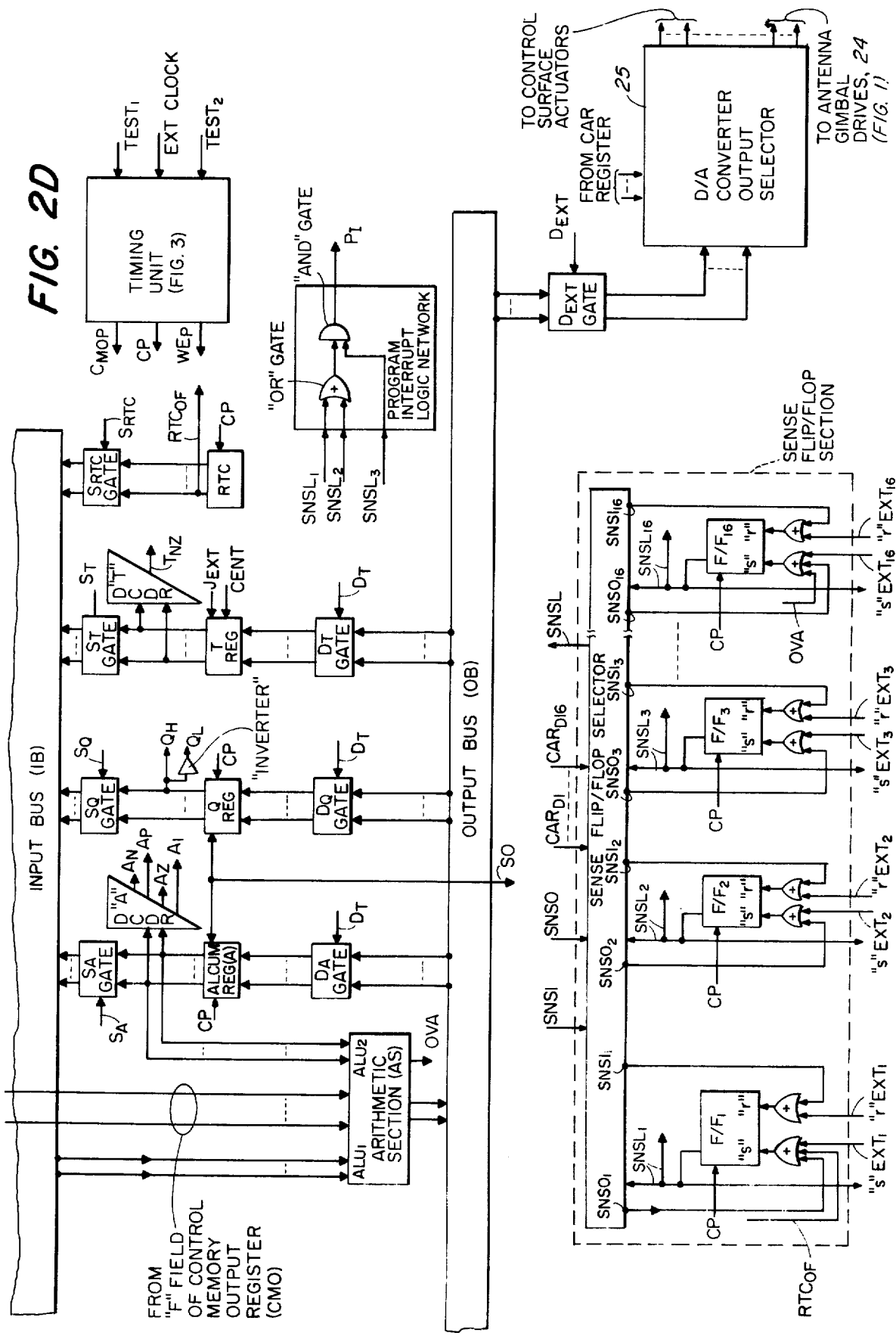

The real time counter RTC is a 12 bit counter adapted to count continuously at the system clock rate of ¼ μs in response to every positive transition at the trailing edge of the clock pulse cp produced by the processor clock CLCK (FIG. 4). Every 1024 μs the real time counter overflows (changes from all 1's to all 0's). Such condition is detected by conventional means here included in the real time counter RTC and in response to such condition a "high" signal or 1 appears on line $RTC_{OF}$. The 1 signal on such line $RTC_{OF}$ is coupled to set one of the 16 flip/flops in the sense flip/flop section to be described, here $F/F_1$. The output of the $F/F_1$ (i.e. $SNSL_1$) is fed to a program interrupt logic network together with the outputs of two other flip/flops, here $F/F_2$ and $F/F_3$ (i.e. $SNSL_2$, $SNSL_3$) as shown in FIG. 2D. Therefore, if either $F/F_1$ or $F/F_2$ is in a "set" condition, then if the $F/F_3$ is also in a set condition a "1" is produced on the program interrupt line, $P_I$. The 1 signal on line $P_I$ causes the control memory selector CMSEL to select the address W from the "W" register in accordance with Table 1 described heretofore.

D/A Converter-Output Selector 25

The D/A converter-output selector 25 is shown in FIG. 5 to include a number of registers $R_1$-$R_n$, each coupled to the output of the $D_{EXT}$ gate. A decoder is provided having its input coupled to the output of the channel address register CAR, as indicated. The decoder has $n$ lines each one being coupled to a different one of the registers $R_1$-$R_n$. In response to the contents of the channel address register CAR one of the signals on such lines is raised "high" thereby to enable the register ($R_1$-$R_n$) coupled thereto to store the digital word passing through the $D_{EXT}$ gate. Digital to analog D/A converters $D/A_1$-$D/A_n$ are coupled to the registers $R_1$-$R_n$, as shown.

In operation the digital word passing through the $D_{EXT}$ gate is converted into a corresponding analog signal and passed to one of the output lines of the D/A converter-output selector 25 in accordance with the word stored in the channel address register CAR.

Channel Address Register (CAR)

The channel address register CAR is an 8 bit register, the contents of which are applied to: (1) An analog-digital input section 20 (see also FIG. 1) for selectively coupling one of a number of inputs (i.e. receiver 18, gyros and accelerometers) to the input bus IB via the gate $S_{EXT}$ when such gate is enabled; (2) A D/A converter-output selector 25 for converting the digital signals on output bus OB to analog signals, when gate $D_{EXT}$ is enabled, and passing such analog signals to a selected one of a nume of missile elements, i.e. wing actuators, antenna gimbal drives; and (3) a CAR decoder thereby to address one of 16 flip-flops comprising a sense flip/flop section, to be described.

Referring first to the analog-digital input section, 20, such section is shown to include an analog signal multiplexer having its input terminals coupled to various analog signal sources (i.e. inertial instruments, 19, (FIG. 1), here missile body gyros and accelerometers). In accordance with the contents of the channel address register CAR a selected one of such inputs is coupled to the output of the analog signal multiplexer. The output of the analog signal multiplexer is coupled to a sample/hold circuit and then to an analog to digital A/D converter as shown. The sample and hold circuit is actuated by a signal supplied by the sample hold flip/flop. The A/D converter is actuated by a signal supplied by the A/D pulse generator.

In operation, when the microinstruction currently resident in the contrl memory output register CMO has in its control/operation C/O field a word which raises the level of the signal on line SAHC, the sample/hold flip/flop produces a signal to actuate the sample/hold circuit thereby to enable such circuit to hold the curent value of the signal at the output of the analog signal multiplexer. A following microinstruction (not necessarily the next in sequence) has a word in its control/operation C/O field which raises the level of the signal on the line SADC thereby to enable the A/D converter to convert the sample to a digital word. This process will be described more fully in connection with the exemplary macroinstruction, "Parallel to External", EXTO, to be described later.

The output of the A/D converter is fed to an input channel of the digital signal multiplexer. Other channels are available for the digital signal multiplexer, such as digital signals produced at the output of the radar receiver 18 (FIG. 1) One of the input channels of the digital signal multiplexer is coupled to the output of such multiplexer in accordance with the word stored in the channel address register CAR. The output of the digital signal multiplexer is connected to a $S_{EXT}$ gate, and when such gate is enabled by a "high" level signal on line $S_{EXT}$ such output is coupled to input bus IB.

The contents of the channel address register CAR are fed to a D/A converter-output selector 25 (FIG. 5). Such D/A converter-output selector 25 has its inputs connected to the output bus (OB) when a "high" level signal is applied to line $D_{EXT}$. The digital signal applied to D/A converter-output selector 25 is converted into an analog signal and is passed to one of a number of output lines (FIG. 5). The output line to which such converted analog signal is coupled is a function of the contents stored in the channel address register CAR. The output lines of such selector 25 may be connected through amplifier circuits to the electromechanical missile wing actuators and missile antenna gimbal drives.

The contents of the channel address register CAR are applied to the CAR decoder. In accordance wit the word stored in the channel address register one of 16 lines $CAR_{D1}$-$CAR_{D16}$ is raised to a "1" or high level, all other 15 lines remaining at a low level of "0". The lines $CAR_{D1}$-$CAR_{D16}$ are fed to a sense flip/flop section to be described.

Sense Flip/Flop Section

Referring now to the sence flip/flop section, a set of CAR decoder output lines $CAR_{D1}$-$CAR_{D16}$ is coupled to a sense flip/flop selector. The input lines to such selector are lines SNSO, SNS1. Lines SNSO and SNS1 are output lines of the C/O Decod. which is coupled to the control/operation field C/O of the control memory output register CMO. The sense flip/flop selector has the following pairs of outputs: $SNS0_1$, $SNS1_1$; $SNS0_2$, $SNS1_2$; ... $SNS0_{16}$, $SNS1_{16}$ in addition to an output line SNSL. Each one of the pairs of outputs is coupled through OR gates to the set $s$ and reset $r$ terminals, respectively, of a different one of 16 flip/flops (i.e. $F/F_1$, $F/F_2$... $F/F_{16}$). In accordance with the levels of the signals of lines $CAR_{D1}$-$CAR_{D16}$ the lines SNS0 and SNS1 become coupled to the set $s$ and reset $r$ terminals respectively of a selected one of the 16 flip/flops. Line OVA from arithmetic section AS is fed to the set $s$ terminal of the $F/F_{16}$, sometimes referred to as the overflow flip/flop, through an OR gate, as shown. The line $RTC_{OF}$ from the real time clock RTC is coupled to the set $s$ terminal of $F/F_1$ through an OR gate, as shown. It should be pointed out that the set $s$ and reset $r$ terminals of the flip/flops $F/F_1$-$F/F_{16}$ are also coupled, through such OR gates, to sources external to the digital processor via lins $s$ $EXT_1$, $r$ $EXT_1$, ... ; $s$ $EXT_{16}$, $r$ $EXT_{16}$, as shown. Such lines are connected to such things as a pulse generator (not shown) actuated when the missile leaves its launch rail (not shown). Similarly, the signals on lines $CAR_{D1}$-$CAR_{D16}$ couple the output of a selected one of the 16 flip/flops (i.e. $SNSL_1$-$SNSL_{16}$) to the line SNSL. Line SNSL is coupled to the condition selector, as shown. It is also noted that the lines $SNSL_1$-$SNSL_{16}$ are also available to various missile elements (not shown) external to the digital processor. Further, the output lines of $F/F_1$, $F/F_2$ and $F/F_3$, (i.e. lines $SNSL_1$, $SNSL_2$ and $SNSL_3$, respectively,) are coupled to the program interrupt logic network previously described.

Examples

Before discussing specific examples illustrative of the operation of the digital processor as a missile controller it may be desirable to first describe a special microinstruction sequence; specifically, the FETCH sequence.

(It is here pointed out that in the following examples the following notation ( )$_8$, ( )$_{10}$, and ( )$_{16}$, is used, where the subscripts 8, 10, and 16 indicate the base of the number included in the parenthesis adjacent thereto.)

FETCH

The FETCH sequence is comprised of a set of three microinstruction located in locations (374)$_8$–(376)$_8$ of the microinstruction control memory (CM). The function of the FETCH sequence is: (1) to obtain, or fetch, the next macroinstruction from the macroprogram memory PM; (2) to apply the proper address to the data memory (DM) in accordance with the indirect/direct address field I of the selected macroinstruction; and (3) to transfer, or "jump", to the first microinstruction in the set thereof defined by the operation field OP of such selected macroinstruction.

The FETCH sequence is initiated upon execution of the last microinstruction in the set thereof associated with the previous macroinstruction. Such "last" microinstruction is identified by having in the JUMP field J the number (374)$_8$, that is the JEXT code. This JEXT code enables a number of initial conditions to occur in the processor: (1) The program counter register PC is incremented thereby causing the address of the next macroinstruction to be applied to the macroprogram memory PM. (After a predetermined settling delay the next macroinstruction will appear at the output of the macroprogram memory PM and such macroinstruction will remain stable so long as the program counter register PC remains unchanged); (2) The T counter is reset to zero; (3) the sample hold flip/flop is reset to zero; (4) the sign control flip/flop is reset to zero; and (5) the data memory selector RSEL flip/flop is reset to zero. [It is noted that the resetting of the data memory selector RSEL flip/flop to zero causes the data memory selector DMSEL to select the instruction address field IA of the selected macroinstruction at the output of the macroprogram memory PM as the address for the data memory DM. After a predetermined settling delay the contents of the data memory DM at the address specified by the instruction address field IA will appear at the output of the data memory DM. As will become evident, when the indirect/direct addressing field IA of the selected macroinstruction calls for direct addressing the data at the output of the data memory DM will be the data to be used by the selected macroinstruction, and when indirect addressing is called the data at the output of the data memory DM will be the address of the data to be used by the selected macroinstruction.] A flow chart of the above is shown in FIG. 6.

The FETCH sequence described above may be represented by the following microinstruction:

microinstruction is executed, therefore, and the instruction address field IA of the selected macroinstruction is transferred XFR to the address register AR. Further, because the RSEL flip/flop has been reset, as discussed, the instruction address field IA of the selected microinstruction then provides the address for the data memory DM. Finally, because the condition true line $C_T$ is "high" and because the control/operation field C/O raises the level of the signal on line OPSL, then, according to Table I the control memory selector CMSEL passes the operation field OP of the selected macroinstruction to the microinstruction control memory CM for addressing the first microinstruction of the set associated with the operation field of such macroinstruction in such memory thereby to complete the FETCH sequence.

If, however, the indirect/direct addressing field I of the selected macroinstruction is "1" (i.e. line $I_L$ is 0) the condition true line $C_T$ is low (i.e. 0). The microinstruction is not executed. Then, in accordance with Table I the control memory selector CMSEL passes the contents of the control memory address register CMAR plus one. That is the next microinstruction in sequence (i.e. the microinstruction at location (375)$_8$ is passed to the microinstruction control memory CM for addressing such memory.

Since the condition field C of the microinstruction at location (375)$_8$ selects the unconditional line U, the microinstruction is executed because line $C_T$ is "high". Therefore, the instruction address field IA of the selected macroinstruction is transferred to the address register AR. Further, the control/operation field C/O raises the level of the line RSLC thereby complementing the RSEL flip/flop. This has the effect of decoupling the instruction address field IA of the selected macroinstruction from the output terminals DMA$_1$–$_9$ of the data memory selector DMSEL and coupling the address register AR to such output terminals. Finally, since the line OPSL is "low", the control memory selector CMSEL passes the contents of the JUMP field of the microinstruction at location (375)$_8$ to the control memory CM for addressing such memory. Here, therefore, the next microinstruction is at location (376)$_8$.

The microinstruction at location (376)$_8$ is also unconditionally executed. Therefore, the data in the data memory at the location specified by the contents of the addressed register AR is addressed. The data at such address is read from memory and is transferred to the address register AR which provides a new address for the data memory DM. Therefore, at the conclusion of the FETCH sequence: (1) the operation code OP of the selected macroinstruction passes through the control memory selector CMSEL to address the first microinstruction associated with such selected macroinstruction; and, (2) the data memory DM is addressed by the

| microinstruction control memory (CM) location | condition field (C) | source field (S) | function field (F) | destination field (D) | control/ operation field (C/O) | jump field (J) |
|---|---|---|---|---|---|---|
| 374 | I$_L$ | S$_{IA}$ | XFR | D$_{AR}$ | OPSL | — |
| 375$_8$ | U | S$_{IA}$ | XFR | D$_{AR}$ | RSLC | (376)$_8$ |
| 376$_8$ | U | S$_{DM}$ | XFR | D$_{AR}$ | OPSL | — |

XFR = Transfer

With the microinstruction at location (374)$_8$ in the microinstruction control memory CM, if the indirect-/direct addressing field I of the macroinstruction addressed by the program counter register PC is "0" (i.e. line I$_L$ is "1") the condition true line CT is high. The address register AR which has stored therein the data at the address provided by the instruction address field IA of the selected macroinstruction.

Analog Input (AI)

This macroinstruction is used to select an analog signal applied to the analog signal multiplexer, convert such analog signal into a corresponding digital word, and then store such digital word in the accumulator register A. The set of microinstructions used to execute the macroinstruction Analog Input AI and starting at location $(067)_8$ of the microinstruction control memory CM are shown below:

| Microinstruction Control Memory (CM) Location | Condition Field (C) | Source Field (S) | Function Field (F) | Destination Field (D) | Control/ Operation Field (C/O) | Jump Field (J) |
|---|---|---|---|---|---|---|
| $(067)_8$ | U | $S_{AR}$ | XFR | $D_{CAR}$ | NOOP | $(264)_8$ |
| $(264)_8$ | U | $S_J$ | XFR | $D_T$ | NOOP | $(-4)_{10}$ |
| $(265)_8$ | $T_{NZ}$ | $S_Z$ | XFR | $D_Z$ | CENT | $(265)_8$ |
| $(266)_8$ | U | $S_Z$ | XFR | $D_Z$ | SAHC | $(267)_8$ |
| $(267)_8$ | U | $S_J$ | XFR | $D_T$ | SADC | $(-4)_{10}$ |
| $(270)_8$ | $T_{NZ}$ | $S_Z$ | XFR | $D_Z$ | CENT | $(270)_8$ |
| $(271)$ | U | $S_{EXT}$ | XFR | $D_A$ | NOOP | $(374)_8$ |

In execution, in response to a first clock pulse the microinstruction at location $(067)_8$ directs that unconditionally the contents in the address register (AR) become applied to the input bus IB, transfer XFR through the arithmetic section AS and the output bus OB to the channel address register CAR. Further, in accordance with Table I, since the condition is satisfied (line $C_T = 1$) and the control/operation field is NOOP (OPSL = 0) in response to the next clock pulse the microinstruction at location $(264)_8$ is addressed (as directed by the JUMP field J).

The microinstruction at location $(264)_8$ directs that, unconditionally, the contents of the JUMP field J, here $(-4)_{10}$, be transferred to the counter register T, and in accordance with Table I, since the source is the JUMP field, (line $S_J$ is "1") the next microinstruction is at the next location in sequence, (i.e. CMAR + 1 = $(265)_8$.

The microinstruction at location $(265)_8$ directs that if the contents of the counter register T are not zero raise the level of the signal on line CENT high, thereby enabling the counter register T to increment by 1. Further, if the contents of the counter register T are not zero, then in accordance with Table I the next microinstruction is at the location specified by the JUMP field J, here $(265)_8$. Therefore, this microinstruction remains for 4 clock pulses, after which the contents of the counter register T become zero, the condition is no longer satisfied (line $C_T$ becomes 0) and, in accordance with Table I, the next microinstruction is at the next location in sequence (i.e. CMAR + 1 = $(266)_8$. The 4 clock pulse delay is to allow settling time for the analog signal multiplexer.

In response to the microinstruction at location $(266)_8$ a "high" signal is transmitted to the sample/hold F/F which in turn actuates the sample/hold circuit. The next microinstruction is at location $(267)_8$, and together with the instruction at location $(270)_8$ enables a 4 clock pulse delay for settling of the A/D converter similar to the 4 clock pulse delay provided by the microinstructions at locations $(264)_8$ and $(265)_8$ for the analog signal multiplexer.

After the 4 clock pulse delay the microinstruction addressed is at location $(271)_8$. In response to such microinstruction the digital word at the input to the digital signal multiplexer channel selected by the contents of the channel address register CAR, here the channel coupled to the A/D converter, is passed through the $S_{EXT}$ gate to the input bus IB transferred via the arithmetic section AS and output bus to the accumulator register A. Further, the next microinstruction is at location $(374)_8$, that is the first microinstruction of the FETCH sequence described above.

Store Accumulator (STA)

This macroinstruction "store accumulator" STA is used to transfer the contents of the accumulator register A to the data memory DM at an address specified by the instruction field address IA of such macroinstruction. The microinstruction in the location of the microinstruction control memory CM specified by the operation field OP of the macroinstruction STA, here an operation field OP of $(011)_8$, is:

| Microinstruction Control Memory Location | Condition Field (C) | Source Field (S) | Function Field (F) | Destination Field (D) | Operation Control Field (C/O) | JUMP Field (J) |
|---|---|---|---|---|---|---|
| $(011)_8$ | U | $S_A$ | XFR | $D_{DM}$ | NOOP | $(374)_8$ |

Such microinstruction directs, unconditionally, the contents in the accumulator register A to transfer to the data memory DM as discussed above. Further, from Table I the next microinstruction is specified by the JUMP field J, here $(374)_8$, (i.e. the FETCH sequence).

Add to Accumulator (ADD)

This macroinstruction, "add to accumulator" ADD, is used to add addressed data stored in the data memory DM to data stored in the accumulator register A. The data in the data memory DM may be directly or indirectly addressed as previously discussed.

The macroinstruction located in the microinstruction control memory CM specified by operation code field OP of the "add to accumulator" macroinstruction ADD, here $(2B)_{16}$, is:

| Microinstruction Control Memory (CM) Location | Condition Field (C) | Source Field (S) | Function Field (F) | Destination Field (D) | Control/ Operation Field (C/O) | JUMP Field (J) |
|---|---|---|---|---|---|---|
| $(2B)_{16}$ | U | $S_{DM}$ | ADD | $D_A$ | NOOP | $(374)_8$ |

Load Accumulator (LDA)

This macroinstruction "load accumulator" LDA is used to load the accumulator register A with data stored in the data memory DM. The data may be directly or indirectly addressed as previously discussed.

The microinstruction located in the microinstruction control memory CM specified by the operation code field OP of the "load accumulator" microinstruction LDA, here $(01)_8$, is:

| Microinstruction Control Memory (CM) Location | Condition Field (C) | Source Field (S) | Function Field (F) | Destination Field (D) | Operation Control Field (C/O) | JUMP Field (J) |
|---|---|---|---|---|---|---|
| $(01)_8$ | U | $S_{DM}$ | XFR | $D_A$ | NOOP | $(374)_8$ |

EXAMPLE I

Let us now consider that it is desired that data in a known location of the data memory DM (here location A) be added to data in location B of the data memory. This example is executed with the following macroinstructions:

| Macroinstruction Mnemonic | Operation Add Field (OP) | Indirect/Direct Addressing Field (I) | Instruction Address Field (IA) |
|---|---|---|---|
| LDA | $(01)_8$ | 0 | A |
| ADD | $(2B)_{16}$ | 0 | B |

Parallel Output to External (EXTO)

This macroinstruction, "parallel output to external" EXTO, is used to transfer data from accumulator register A to a desired one of the output channels of the D/A converter-output selector 25. The desired channel is designated by a digital word stored in a known address in the data memory DM. Hence, by the following marcoinstruction data in the accumulator register A is transferred to the output channel designated by the data in location $(100)_{10}$ of the data memrory DM.

| Macroinstruction Mnemonic | Operation Code Field (OP) | Indirect/Direct Addressing Field (I) | Instruction Address Field (IA) |
|---|---|---|---|
| EXTO | $(39)_{16}$ | 0 | $(100)_{10}$ |

The microinstructions to execute this macroinstruction are as follows:

EXAMPLE II

Let us now consider that one of the flip/flops in the sense flip/flop section, say $F/F_1$, had been placed in a "set" condition by an external source, as when a "high" signal having been applied by line $s$ $EXT_1$. Further, if it has been "set" the next macroinstruction in sequence will be obtained and if it has not been "set" the next macroinstruction in sequence will be skipped and the macroninstruction following that (i.e. the second macroinstruction in sequence) will be obtained for execution. In order to detect the state of $F/F_1$, the following macroinstruction is used:

| Mnemonic | Operation Code Field (OP) | Indirect/Direct Addressing Field | Instruction Address Field (IA) |
|---|---|---|---|
| SEN | $(20)_{16}$ | 0 | $(1)_{10}$ |

The microinstructions corresponding to the macroinstructions are as follows:

| Microinstruction Control Memory (CM) Location | Condition Field (F) | Source Field (S) | Function Field (F) | Destination Field (D) | Control/ Operation Field (C/O) | JUMP Field (J) |
|---|---|---|---|---|---|---|
| $(20)_{16}$ | U | $S_{AR}$ | XFR | $D_{CAR}$ | INPC | $(75)_{16}$ |
| $(75)_{16}$ | SNSL | $S_{PC}$ | XFR | $D_{PC}$ | NOOP | $(374)_8$ |

In response to the macroinstruction at location $(20)_{16}$ the contents of the address register AR (which here contains a 1 from execution of the FETCH sequence) are transferred to the channel address register CAR and the program counter register (PC) is incremented. Further, the microinstruction indicated by the JUMP field, here location $(75)_{16}$, is addressed. In response to such addressed microinstruction, if $F/F_1$ is in a "set" condition then the contents of the program counter register are not incremented since line JEXT is "high" and line "$D_{PC}$" is high (for reasons described) and the program counter continues to store the address of the next macroinstruction. If, however, $F/F_1$ is not in a set condition, the program counter register PC does not become a destination (that is line $D_{PC}$ is "low") and the program counter register PC is incremented again to store the address of the second macroinstruction in sequence.

TEST

Having described the operation of the digital processor 22, it should now be apparent that the control of the various constituents thereof are, in effect, controlled by the execution of a 32 bit word stored in the control memory output register CMO. As will become apparent hereinafter, this feature allows the digital processor

| Macroinstruction Control Memory Location (C) | Condition Field (S) | Source Field (F) | Function Field (D) | Destination Field (C/O) | Control Operation Field (J) | JUMP Field |
|---|---|---|---|---|---|---|
| $(39)_{16}$ | U | $S_{DM}$ | XFR | $D_{CAR}$ | NOOP | (B9) |
| $(B9)_{16}$ | U | $S_A$ | XFR | $D_{EXT}$ | NOOP | $(374)_8$ |

22 to be checked out after having been "sealed" in a missile. The checkout may be performed by automatic test equipment (not shown) carried on the aircraft 12, or located at a missile loading station where the missile is checked out prior to being loaded on the aircraft 12. The automatic test equipment (not shown) here is a general purpose computer (not shown) adapted to: (1) apply "high" or "low" signals on lines TEST$_1$ and TEST$_2$ for purposes to be described in detail; (2) apply serial data on lines SL$_I$; (3) receive serial data on lines S$_O$ and/or SL$_O$; (4) apply clock pulses from a clock source (EXT clock) external to the missile 10; and receive signals on line JEXT from the processor 22 for reasons to become apparent.

Figure 3:
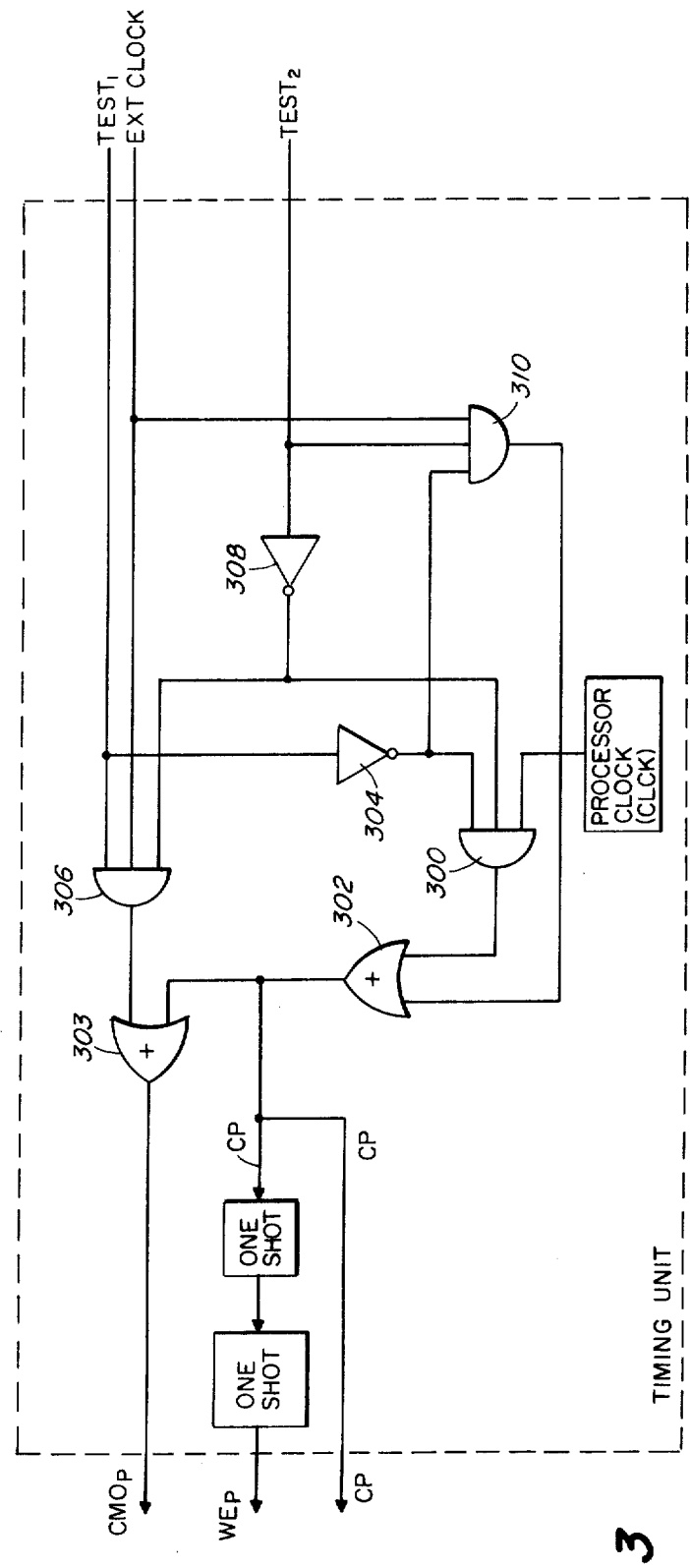
FIG. 3 is a logic diagram of a timing unit used in the digital processor.
Figure 4:
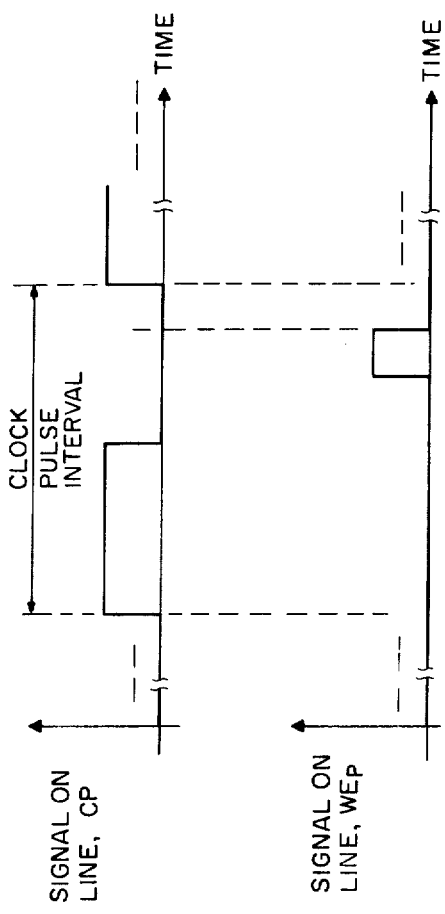
FIG. 4 is a timing diagram showing clock pulses and with write enable pulses produced within the digital processor.

Referring now also to FIG. 3, the operation and construction of the timing unit will now be discussed in connection with the testing of the digital processor 22. First, when the signals on lines TEST$_1$ and TEST$_2$ are both "low" (i.e. 0) the pulses produced by the processor clock CLCK are allowed to pass through AND gate 300 and OR gate 302 to: (1) the clock pulse line c.p.; (2) the line CMO$_P$ via OR gate 303; and (3) line WE$_P$, through a pair of cascaded one shot multivibrators. (Further, the control memory output register CMO is set for loading parallel data applied thereto from the microinstruction control memory CM.) Therefore, when "low" signals are applied to lines TEST$_1$ and TEST$_2$ the digital processor 22 is enabled to operate in its normal mode of operation. It is here noted that when the missile is launched from the aircraft the signals on lines TEST$_1$ and TEST$_2$ are both low and hence the digital processor 22 operates in its normal mode to provide guidance and stabilization signals to the missile as described.

When the automatic test equipment (not shown) provides a "high" signal to line TEST$_1$ and a "low" signal to line TEST$_2$, clock pulses produced by the processor clock CLCK are inhibited from passing through AND gate 300 to lines CP, CMO$_P$ and WE$_P$ because of the "low" signal produced at the output of inverter 304. However, clock pulses from the external clock via line EXT CLOCK (not shown) disposed in the automatic test equipment (not shown) pass through AND gate 306 (because the signal produced at the output of inverter 308 is "high") and through OR gate 303 to line CMO$_P$. Therefore, because the signal on line TEST$_1$ is "high" data applied serial to input line SL$_I$ from the automatic test equipment (not shown) is clocked into the control memory output register (CMO) in response to pulses supplied to such timing unit on line EXT CLOCK. After 32 of such pulses are so applied a "test microinstruction" is stored in the control memory output register CMO.

After such "test microinstruction" has been so stored the automatic test equipment (not shown) provides a "low" signal on line TEST$_1$, and a "high" signal on line TEST$_2$. In response to such signals the control memory output register CMO is set for loading parallel data applied thereto from the microinstruction control memory CM. Further, because of the "high" signal produced by inverter 304, the pulses on line EXT CLOCK pass through AND gate 310, OR gate 302 to lines CMO$_P$, CP and WE$_P$. Therefore, the digital processor 22 executes the "test microinstruction" in its normal manner of operation except such execution is carried out with pulses supplied on lines CP, WE$_P$ and CMO$_P$ by the EXT clock of the automatic test equipment (not shown).

Finally, when the automatic test equipment produces "high" signals on both lines TEST$_1$ and TEST$_2$, pulses are inhibited from passing to lines CP, WE$_P$ and CMO$_P$ from either the processor clock CLCK or the clock of the automatic test equipment. Such condition is a "pause" condition and enables the automatic test equipment (not shown) to analyze data fed thereto during the test operation via line SO.

From the above it is now apparent that a variety of "test microinstructions" may be introduced into the processor and executed by such processor in response to signals supplied by the automatic test equipment. Further, each "test microinstruction" may itself be read as the next one thereof is entered. This is because the last stage of the control memory output register is coupled to a line SL$_O$, which line is also fed to the automatic test equipment (not shown). Such "test microinstruction" may include in its "JUMP field" the JEXT code which thereby selects the beginning of the FETCH sequence as the next instruction from the microinstruction central memory (CM). By applying proper signals to line TEST$_1$ and TEST$_2$, the processor is placed in its normal operating mode except here under the control of the external clock pulses, as discussed.

Further, because line JEXT is also fed to the automatic test equipment the number of macroinstructions executed during the test operation may be accounted by properly recording the signals on line JEXT by the automatic test equipment (not shown) since such line is raised to a "high" level at the completion of each one of the last microinstructions associated with such executed macroinstruction. This testing thereby enables testing of the overall processor and each one of the constituents thereof.

Having described a preferred embodiment of the invention it will now be apparent to one of skill in the art that other embodiments incorporating its concepts may be used. For example, the digital processor may be used with a ground launched missile or a missile having active radar system or an infrared seeking missile. Further the size of the macroprogram and microinstruction control memories may be increased or decreased with accompanying changes in the number of bits making up the words stored in such memories. Further other macroinstructions may be used with accompanying additional microinstructions. Still further variations in the generation of the write enable pulses and D/A converter-output selector will now be apparent to one of skill in the art. It is felt, therefore, that this invention should not be restricted to the disclosed embodiment, but rather should be limited only by the spirit and scope of the following claims.

It is claimed that:

1. In a digital processor wherein a macroinstruction memory stores a repertoire of macroinstructions, each one of such macroinstructions corresponding to a set of microinstructions; a microinstruction memory stores sets of such microinstructions; a register means stores a digital control word; a source decoder means couples data from one of a plurality of data sources to an input bus selectively in accordance with the stored digital control word; an arithmetic section processes data on such input bus in accordance with the stored digital control word and passes such processed data to an output bus; and a destination decoder means couples processed data on such output bus to one of a plurality of destinations selectively in accordance with the stored digital word, the improvement comprising:
- a. a first input means connected to the microinstruction memory for coupling a selected one of the microinstructions in parallel form to such register means;
- b. a second input means for coupling binary signals in serial form from a source external to the processor to the register means;
- c. control signal means for enabling such register means to store, selectively in accordance with a control signal, as the stored digital word, either the microinstruction coupled by the first input means or the binary signals coupled by the second input means;
- d. a condition selector means, coupled to the register means and to a plurality of binary signal sources, for coupling one of such binary signal sources onto a condition true line selectively in accordance with the stored digital word; and, including gate means, responsive to the binary signal source on the condition true line, for enabling or inhibiting, selectively in accordance with the binary signal on the condition true line, the processed data on the output bus to pass to the selected one of the destinations; and
- e. a plurality of flip/flops; a flip/flop selector having a plurality of inputs coupled to the plurality of flip/flops; and, means for coupling a selected one of such flip/flops through the flip/flop selector to enable such selected one of such flip/flops to serve as one of the plurality of binary signal sources.

2. The improvement recited in claim 1 including a data memory; a data memory selector means having a first addressing input coupled to the macroinstruction memory and a second addressing input coupled to one of the plurality of the data sources, such data memory selector means being responsive to a second control signal, for coupling either the data on the first addressing input or the data on the second addressing input selectively in accordance with the second control signal to address such data memory; means, responsive to the stored digital control word, for generating the second control signal; means for coupling input data to such data memory from the output bus; and means for coupling data stored in such data memory to the input bus.

3. In a digital processor wherein a macroinstruction memory stores a repertoire of macroinstructions, each one of such macroinstructions corresponding to a set of microinstructions: a microinstruction memory stores sets of such microinstructions; a register means stores a digital control word; a source decoder means couples data from one of a plurality of data sources to an input bus selectively in accordance with the stored digital control word; an arithmetic section processes data on such input bus in accordance wih the stored digital control word and passes such processed data to an output bus; and a destination decoder means couples processed data on such output bus to one of a plurality of destinations selectively in accordance with the stored digital word, the improvement characterized in that such register means comprises:
- a condition selector means coupled to the register means and to a plurality of binary signal sources for coupling a selected one of such binary signal sources as a signal onto a condition true line selectively in accordance with the stored digital word, and including gate means, responsive to the signal on the condition true line, for enabling or inhibiting the processed data to pass to the selected one of the destinations selectively in accordance with the signal on the condition true line;
- a plurality of flip/flops;
- a flip/flop selector having a plurality of inputs coupled to the plurality of flip/flops; and
- means for coupling a selected one of such flip/flops through the flip/flop selector to enable such selected one of such flip/flops to serve as one of the plurality of binary signal sources.

4. The improvement recited in claim 3 including a data memory; a data memory selector means having a first addressing input coupled to the macroinstruction memory and a second addressing input coupled to one of the plurality of data source, such data memory selector means being responsive to a second control signal for coupling either the data on the first addressing input or the data on the second addressing input selectively in accordance with the second control signal to address such data memory; means, responsive to the stored digital word, for generating the second control signal; means for coupling input data to such data memory from the output bus; and means for coupling data stored in such data memory to the input bus.

* * * * *

UNITED STATES PATENT OFFICE
CERTIFICATE OF CORRECTION

Patent No. 4,037,202                    Dated July 19, 1977

Inventor(s)    John Terzian

It is certified that error appears in the above-identified patent and that said Letters Patent are hereby corrected as shown below:

Column 4, line 49, add -- (   ) -- around "RAM";

Column 13, line 26, delete "nume" and insert therefor -- number --;

line 46, delete "contrl" and insert therefor -- control --;

Column 14, line 26, delete "sence" and insert therefor -- sense --;

line 51, delete "lins s" and insert therefor -- lines --;

Column 20, line 10, delete "macroninstruction" and insert therefor -- macroinstruction --.

Signed and Sealed this

Fourth Day of October 1977

[SEAL]

Attest:

RUTH C. MASON  
*Attesting Officer*

LUTRELLE F. PARKER  
*Acting Commissioner of Patents and Trademarks*